United States Patent [19]

Smith, Jr.

[11] Patent Number: 4,528,767
[45] Date of Patent: Jul. 16, 1985

[54] FISHING LINE AGITATOR

[76] Inventor: Willard G. Smith, Jr., 71 Cemetery Rd., Harwich, Mass. 02645

[21] Appl. No.: 544,792

[22] Filed: Oct. 24, 1983

[51] Int. Cl.³ .......................................... A01K 87/00
[52] U.S. Cl. ..................................................... 43/19.2
[58] Field of Search ....................... 43/19, 19.2, 21, 17

[56] References Cited

U.S. PATENT DOCUMENTS

| | | | |
|---|---|---|---|
| 2,276,515 | 1/1957 | Lynch | 43/21 |
| 2,494,952 | 1/1950 | Luton et al. | 43/21 |
| 2,643,478 | 6/1953 | Paulsen | 43/19.2 |
| 3,031,790 | 5/1962 | Duryea | 43/19.2 |
| 3,466,784 | 9/1969 | Bonner | 43/19.2 |
| 3,863,379 | 2/1975 | Kobayashi | 43/19.2 |
| 4,100,695 | 7/1978 | Blanchard | 43/19.2 |

FOREIGN PATENT DOCUMENTS 445943 1/1948 Canada ..................................... 43/21

Primary Examiner—Nicholas P. Godici
Assistant Examiner—M. Jordan
Attorney, Agent, or Firm—Arthur W. Francis

[57] ABSTRACT

Apparatus for agitating a fishing line and imparting to the lure an oscillating motion. The apparatus is mounted on the fishing pole and also releasibly engaged with the fishing line. In order to provide the motion a small electric motor causes a shaft to rotate. The shaft has helical threads and causes a rider slideably meshed with the threads to move forward and backward. The fishing line by reason of its attachment to the rider is agitated into an oscillatory motion which is transmitted to the lure.

4 Claims, 2 Drawing Figures

FISHING LINE AGITATOR

BRIEF DESCRIPTION OF THE INVENTION

This invention relates to an apparatus for producing an oscillating motion of a fishing line which in turn causes the lure attached to the line to move up and down in the water. The effect is to cause the lure to have the action of live bait such as minnows. It is the common practice of fishermen to jig or pull the fishing line frequently to cause the lure to simulate the action of live bait. In trolling, on the other hand, the line, and consequently, the lure is dragged through the water at a relatively constant rate of speed. In the case of jigging the line, physical effort is required to simulate the darting action of fish.

A primary object of this invention is to provide apparatus of a simple nature which takes a part of the physical effort out of luring fish and in turn provides a constant darting motion to the lure, simulative of the motion of a fish.

A second object of the invention is to provide apparatus attachable to the fishing pole and removeably connected to a fishing line that will impart a constant oscillatory motion to the lure attached to the line.

Other objects of the invention will be obvious from the following description, drawings, and claims.

Figure 1:
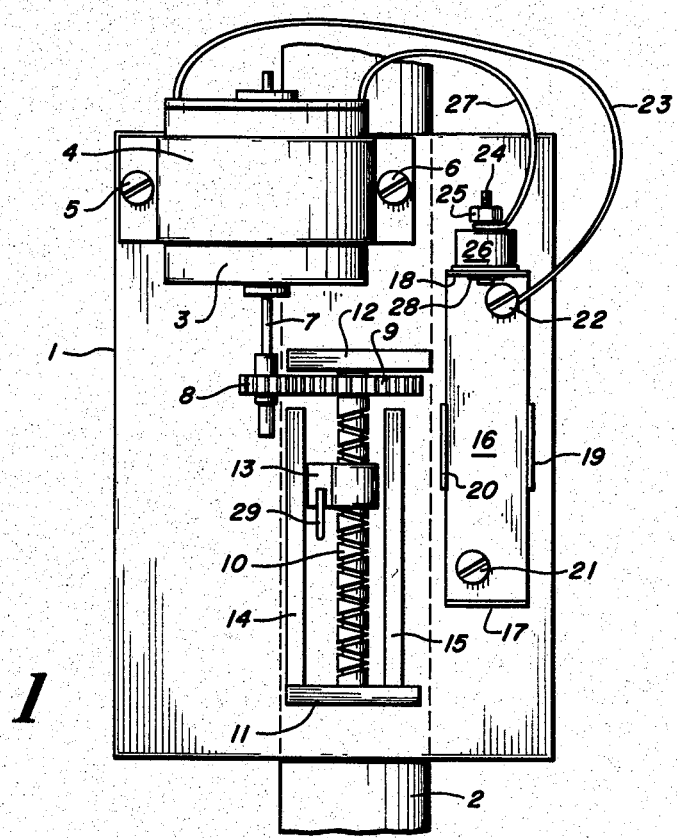
FIG. 1 is a top plan of the apparatus.

Referring more specifically to the drawings and in particular FIG. 1 there is shown the apparatus of the present invention applied to a conventional fishing rod of which rod only a small section is shown. Base 1 is employed as a mount for the apparatus and also for attachment to the fishing rod. 2. A small electric motor 3 is secured to the base by a strap 4 having screws 5 and 6 passing through the strap 4 and into the base 1. A motor shaft 7 is keyed to a small gear 8. Gear 8 meshes with large gear 9. Shaft 10 is mounted revolvably on brackets 11 and 12. Shaft 10 is characterized by having two sets of helical threads along a major portion of its length. The first set of threads are helically spiralled in an unwinding direction in opposition to the second set of threads. A rider 13 is meshed with the threads and accordingly moves forward and backward in an encompassing meshed arrangement with shaft 10. The rider 13 is prevented from rotating by vertical restraints 14 and 15. The rider 13 accordingly is encompassingly mounted on the ahaft 10 and meshes with the threads in the shaft 10. The rider 13 is in sliding and rotation resisting contact with vertical restraints 14 and 15. A metal battery holder 16 is mounted on base 1 and has vertical spring clips 17, 18, 19, 20 for pressing against and holding a small battery not shown. The vertical spring clips 17, 18, 19, 20 are simply vertical projections from the battery holder 16 and are preferably made of a thin flexible metal. Battery holder 16 is secured to base 1 by screws 21 and 22. A conducting wire 23 is secured to screw 22 and is further connected to motor 3. A second screw 24 passes through vertical spring clip 18 and is locked into contact with vertical spring clip 18 by a nut 25. An electrically insulating washer 26 separates the nut 25 from vertical spring clip 18. A conducting wire 27 from the electric motor 3 is attached to the screw 24 between washer 26 and nut 25. An electrically insulating washer 28 is inserted between the head of the screw 24 and the vertical spring clip 18. When the battery is inserted between the clips 17, 18, 19, and 20, an electrical series circuit is established between clip 17, battery holder 16, screw 22, wire 23, and the motor 3. The circuit is completed between screw 24, wire 27, and the motor 3.

Figure 2:
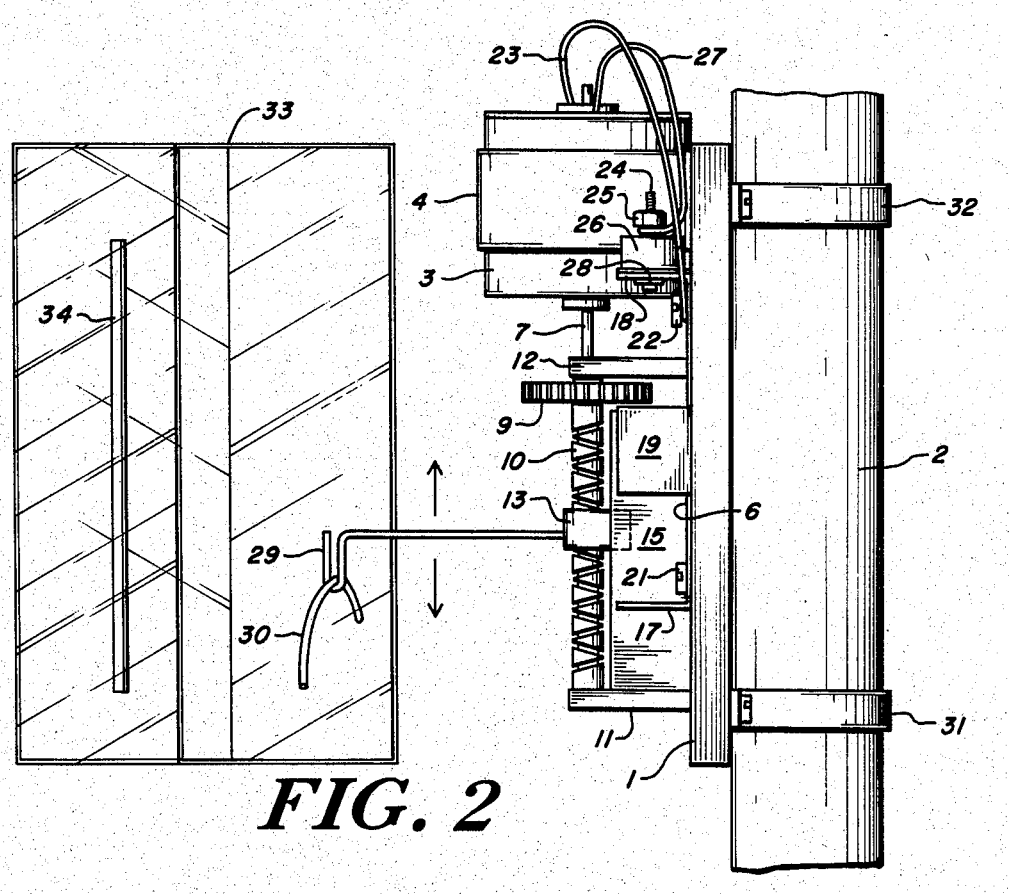
FIG. 2 is a side elevation of the apparatus.

Referring now more specifically to FIG. 2 a hooked rod 29 is integrally mounted on rider 13. Fishing line 30 of which a portion only is shown fits into the hooked portion of rod 29 and is preferably attached to a fishing reel mounted on the fishing pole.

Fasteners 31 and 32 are attached to base 1 and encompass the pole 2 in a manner such as to secure the assembly to the pole 2 in a fixed relationship. A plastic cover 33 is shown raised and slightly tilted from its normally encompassing relationship of the fishing jig assembly. Cover 33 is adapted to be pressed down upon the sides of base 1 and be secured to base 1 by frictional contact with the sides. A slot 34 is provided in the top of cover 33 to accomodate the travel of rider 13 and attached hooked rod 29 mounted thereon.

The invention is illustrated in FIGS. 1 and 2 with small gear 8 engaged with large gear 9 to provide a speed reducing means between motor revolutions per minute and the desired oscillating speed of the rider 13. It should be understood that the speed reducing means is not limited to the use of gear reduction means but can be accomplished by a belt and pulley arrangement in which the relative size of the pulleys govern the reduction in speed. A less desireable alternative is to provide no speed reduction means and have motor shaft 7 directly connected with shaft 10 wherein the oscillating motion of rider 13 is very rapid.

I claim:

1. An apparatus for imparting oscillatory motion to a fishing line comprising a rotatable shaft having oppositely disposed helical threads and further having communicating threads on opposite ends of the threaded length, a rider moveably meshed with the threads and responsive to the shaft rotation and capable thereby of advancing along the shaft to the end of one threaded length and then being meshingly received by the oppositely disposed thread for motion in the opposite direction, a hooked shaped means integrally connected to said rider and removeably connected to said line, electrical power generating means for providing motive force and an electric motor which is rotatable in a single direction only receiving electric power from the power generating means and providing rotative motive force to said shaft to thereby oscillate said rider along said shaft.

2. An apparatus for imparting oscillatory motion to a fishing lure attached to a fishing line and pole comprising a rotatable shaft having oppositely disposed helical theads and further having communicating threads on opposed ends of the threaded length, a rider moveably meshed with the threads and responsive to the shaft rotation and capable thereby of advancing along the shaft to the end of one threaded length and then being meshingly received by the oppositely disposed thread for motion in the opposite direction, hooked shaped means integrally attached to said rider and removeably connected to said line, electric power generating means, an electric motor which is rotatable in a single direction only receiving power from said power generating means, a first shaft connected to said electric motor and rotating about its longitudinal axis in response to the rotation of the electric motor and further in parallel spaced relationship with said shaft having oppositely disposed helical threads and speed reducing means interposed between said first shaft and said helically threaded shaft to thereby oscillate said rider along said shaft.

3. An apparatus as in claim 2 wherein said speed reducing means comprise two meshed gears of unequal diameter, said first shaft having keyed thereto the smaller diameter gear and said helically threaded shaft having keyed thereto the larger diameter gear whereby in rotational meshed contact the rotating speed of the motor is translated into a ratio of diameter influenced slower speed of the rotating helically threaded shaft.

4. An apparatus for imparting oscillatory motion to a fishing lure attached to a fishing line and pole comprising a rotatable shaft having oppositely disposed helical threads and further having communicating threads on opposed ends of the threaded length, a rider contacting and moveably meshed to said threads and adaptable thereby of advancing along the shaft to the end of one threaded length and then being meshingly received by the oppositely disposed thread for motion in the opposite direction, hook-shaped means integrally attached to said rider and removeably connected to said line, electric power generation means, an electric motor which is rotatable in a single direction only receiving power from said power generating means, a first shaft connected at one end to said motor and connected at its other end to said helically threaded shaft whereby said helically threaded shaft rotates in response to said motor rotation transposing said rotation into an oscillating motion of said rider along said shaft.

* * * * *